(12) United States Patent
Christiance et al.

(10) Patent No.: US 7,529,185 B2
(45) Date of Patent: May 5, 2009

(54) METHOD, SYSTEM AND PROGRAM PRODUCT FOR DETERMINING BANDWIDTH CONSUMPTION ACROSS A MULTI-TIERED COMPUTER ENVIRONMENT

(75) Inventors: Kenneth D. Christiance, Apex, NC (US); Gregg W. Machovec, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 11/043,364

(22) Filed: Jan. 26, 2005

(65) Prior Publication Data

US 2006/0165010 A1    Jul. 27, 2006

(51) Int. Cl.
  *G01R 31/08* (2006.01)
  *G06F 15/173* (2006.01)
(52) U.S. Cl. ........................... 370/229; 709/224
(58) Field of Classification Search ............... 370/229, 370/252, 232, 235, 468
  See application file for complete search history.

(56) References Cited

U.S. PATENT DOCUMENTS 6,578,077 B1 * 6/2003 Rakoshitz et al. ........... 709/224
2002/0083170 A1 * 6/2002 Collazo ...................... 709/224
2002/0152304 A1 * 10/2002 Collazo ...................... 709/224
2002/0188730 A1 * 12/2002 Tang et al. .................. 709/227

* cited by examiner

*Primary Examiner*—Daniel J Ryman
*Assistant Examiner*—John Blanton
(74) *Attorney, Agent, or Firm*—Arthur J. Samodovitz

(57) ABSTRACT

Under the present invention, communication flows between applications in the multi-tiered environment are identified. For each communication flow identified, bandwidth consumption is determined. In general, the bandwidth consumption for a communication flow is determined based on a set of variables that includes one or more of the following: whether the communication flow is persistent, a payload/package size of the communication flow, a quantity of destination computers (endpoints) for the communication flow, a required delivery time for the communication flow, a desired network utilization for the communication flow, and a rate of simultaneous use of applications involved the communication flow. Once determined, the bandwidth consumption for the individual communication flows can be aggregated to determine the total bandwidth consumption across the environment. Using this value, decisions can be made about the best way to deploy or arrange the environment.

17 Claims, 7 Drawing Sheets

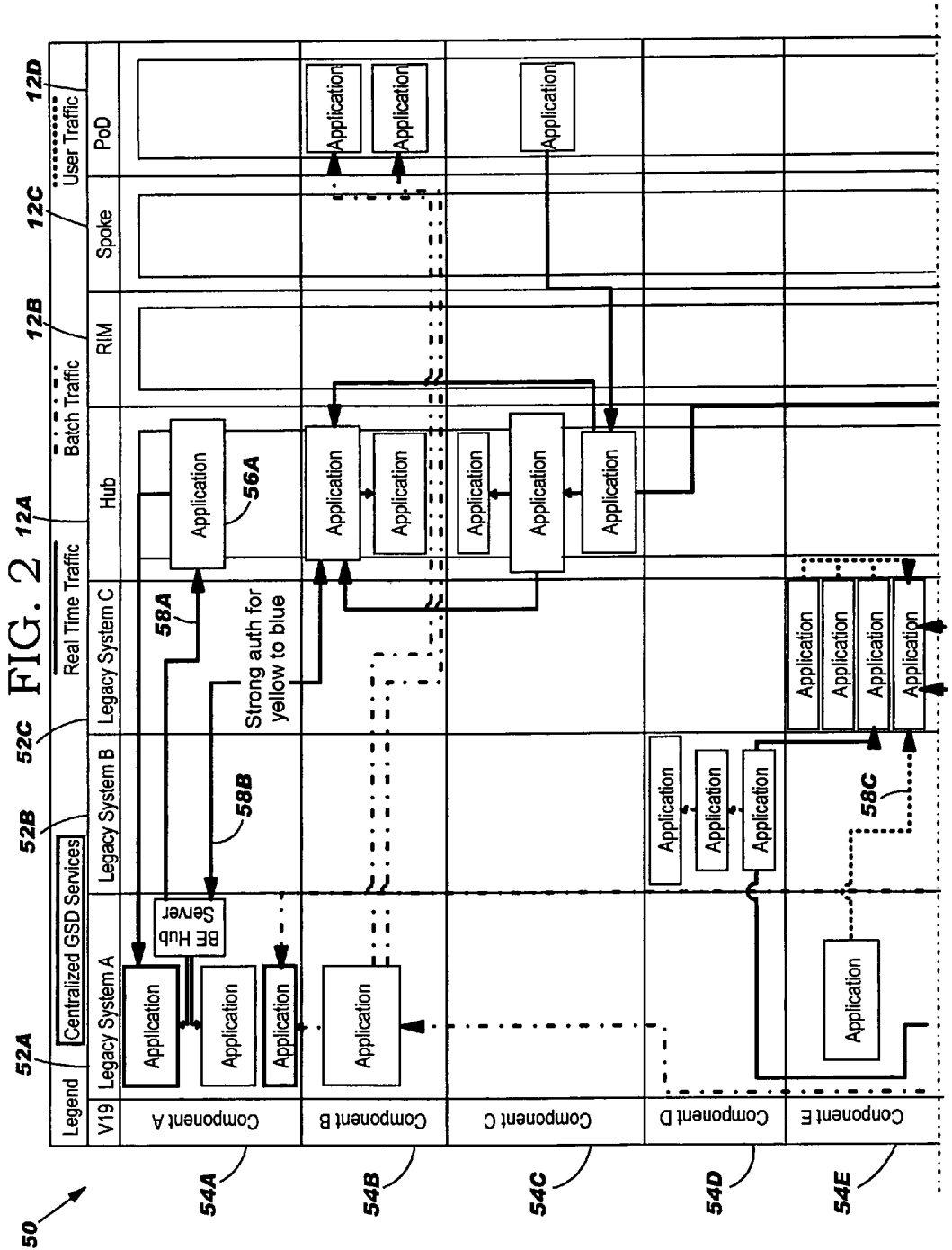

METHOD, SYSTEM AND PROGRAM PRODUCT FOR DETERMINING BANDWIDTH CONSUMPTION ACROSS A MULTI-TIERED COMPUTER ENVIRONMENT

BACKGROUND OF THE INVENTION

1. Field of the Invention

The present invention generally relates to multi-tiered computer environments. Specifically, the present invention relates to a method, system and program product for determining bandwidth consumption across a multi-tiered computer environment.

2. Related Art

As computing environments become more advanced, a recent trend has started towards multi-tiered computer environments. Such environments can generally be considered in a hierarchical form that is geographically dispersed. Under these environments, various components and corresponding applications are placed among the tiers in such a way that their use is optimized.

Unfortunately, given the widespread use and functionality that a multi-tiered computer environment provides, it can be prone to instances of increased bandwidth consumption. This can happen, for example, when applications communicate with one another, when an increased volume of users operate within the environment, etc. As such, bandwidth consumption is an important factor to be considered when deploying and managing a multi-tiered computer environment.

SUMMARY OF THE INVENTION

In general, the present invention provides a method, system and program product for determining bandwidth consumption across a multi-tiered computer environment. Specifically, under the present invention, the multi-tiered computer environment is first analyzed to identify the components and tiers thereof, as well as the placement of any applications associated with the components among the tiers. Once the computer environment has been "mapped out" in this manner, any communication flows between the applications are identified. Thereafter, for each communication flow, bandwidth consumption is computed/determined. In general, bandwidth consumption for a communication flow is determined based on a set of variables that includes one or more of the following: whether the communication flow is persistent, payload/package size of the communication flow, a quantity of destination computers (endpoints) for the communication flow, a required delivery time for the communication flow, a desired network utilization for that communication flow, and a rate of simultaneous use of applications involved the communication flow.

Once determined, the bandwidth consumption for the individual communication flows can be aggregated to determine the total bandwidth consumption across the environment and/or between each tier of the multi-tiered computer environment. Using this value, decisions can be made about the best way to deploy or arrange the environment (e.g., where to locate tiers, individual computers, applications, etc.).

In one aspect of the present invention, a method for determining bandwidth consumption across a multi-tiered computer environment is provided. Under the method, communication flows throughout the multi-tiered computer environment are identified. Thereafter, bandwidth consumption for the communication flows are determined based on one or more of the following variables: a size of the communication flows, a number of destination computers for the communication flows, a rate of simultaneous use of applications involved with the communication flows, a required delivery time for the communication flows and a desired network utilization for the communication flows.

In another aspect the present invention, components and tiers of the multi-tiered computer environment are identified and a placement of the applications among the components and tiers are determined.

In another aspect of the present invention, the bandwidth consumption across the entire multi-tiered computer environment is determined by aggregating the bandwidth consumption for the individual communication flows.

In another aspect of the present invention, a system and program product for determining bandwidth consumption across a multi-tiered computer environment is provided. Under the system and program product, communication flows throughout the multi-tiered computer environment are identified, and variables are obtained for determining bandwidth consumption for the communication flows. Under the present invention, the variables generally include one or more of the following: a size of the communication flows, a number of destination computers for the communication flows, a rate of simultaneous use of applications involved with the communication flows, a required delivery time for the communication flows and desired network utilization for the communication flows. Thereafter, bandwidth consumption for the communication flows are determined based on the variables.

In another aspect of the present invention, a method for deploying an application for determining bandwidth consumption across a multi-tiered computer environment is provided. Under this method, a computer infrastructure is provided. The computer infrastructure is operable to identify communication flows throughout the multi-tiered computer environment, and obtain variables for determining bandwidth consumption for the communication flows. The computer infrastructure is further operable to determine bandwidth consumption for the communication flows based on the variables.

The computer software includes instructions for causing a computer system to identify communication flows throughout the multi-tiered computer environment, and obtain variables for determining bandwidth consumption for the communication flows. The instructions further cause the computer system to determine bandwidth consumption for the communication flows based on one the variables.

Therefore, the present invention provides a method, system and program product for determining bandwidth consumption across a multi-tiered computer environment.

BRIEF DESCRIPTION OF THE DRAWINGS

These and other features of this invention will be more readily understood from the following detailed description of the various aspects of the invention taken in conjunction with the accompanying drawings in which.

Figure 1:
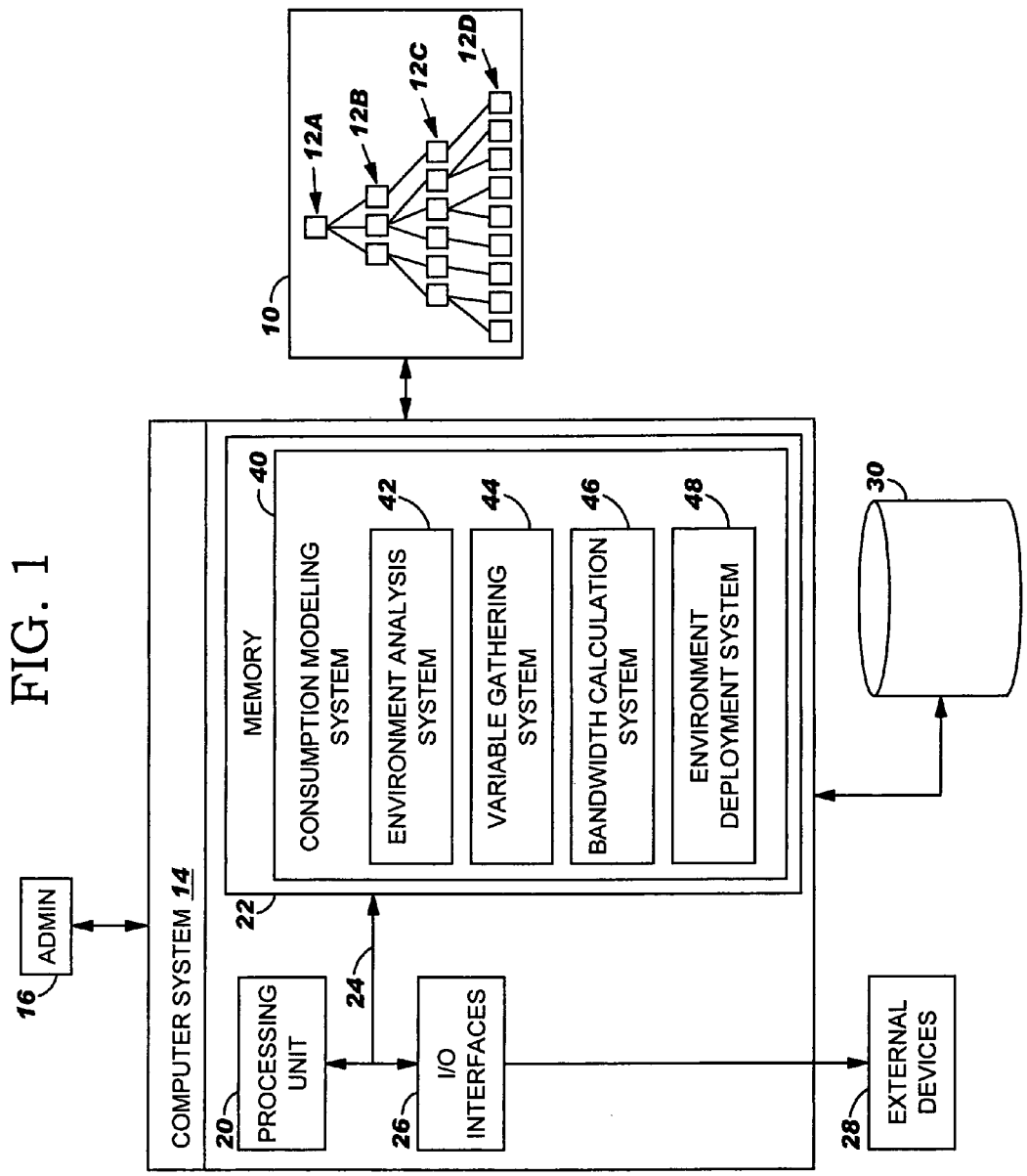
FIG. 1 depicts a system for determining bandwidth consumption across a multi-tiered computer environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for determining bandwidth consumption across a multi-tiered computer environment. Specifically, under the present invention, the multi-tiered computer environment is first analyzed to identify the components and tiers thereof, as well as the placement of any applications associated with the components among the tiers. Once the computer environment has been "mapped out" in this manner, communication flows between the applications are identified. Such communication flows typically involve a "pushing" or "pulling" of a package (e.g., a software-based package) from one application to another.

For each communication flow identified, bandwidth consumption is computed/determined. In general, the bandwidth consumption for a communication flow is determined based on a set of variables that includes one or more of the following: whether the communication flow is persistent, a payload/package size of the communication flow, a quantity of destination computers (endpoints) for the communication flow, a required delivery time for the communication flow, a desired network utilization for the communication flow, and a rate of simultaneous use of applications involved the communication flow. Once determined, the bandwidth consumption for the individual communication flows can be aggregated to determine the total bandwidth consumption across the environment. Using this value, decisions can be made about the best way to deploy or arrange the environment (e.g., where to locate tiers, individual computers, applications, etc.).

Referring now to FIG. 1, a system for determining bandwidth consumption across a multi-tiered computing environment (hereinafter "environment 10") is shown. In general, environment 10 includes multiple tiers 12A-D that are geographically distributed. It should be appreciated in advance that the depiction of environment 10 is intended to be illustrative only and that other variations exist. For example, environment 10 need not include four tiers 12A-D. Moreover, the quantity of "nodes" on each tier 12A-D is not limited to the quantity shown in FIG. 1. For example, tier 12A could have four nodes instead of the single node shown. Regardless, in an illustrative embodiment, environment 10 can be a Centralized Management System (CMS) similar to that implemented by International Business Machines Corp. (IBM) of Armonk, N.Y. In IBM's CMS, the node(s) of tier 12A are referred to as "Hubs," which are strategically located control centers where high level core tools reside. The node(s) of tier 12B are referred to as Regional Infrastructure Management Systems or "Rims," which are regionally placed tools that provide management to attached lower tier nodes. The Rims also serve as an aggregator of the lower level nodes for the Hubs. In general, the Rims are located at SDCs (Service Delivery Centers), business partner sites or customer premises. Further, in IBM's CMS, the node(s) of tier 12C are referred to as "Spokes," which provide an extension of Rim tools and also provide capacity scaling. Spokes are typically co-located with a Rim, or on IBM premises, business partner sites or customer premises. Still yet, the node(s) of tier 12D are referred to as Points of Deployment or "PoDs," which are placed wherever a customer resource resides. PoDs generally serve as an endpoint for a Spoke to provide provisioning capabilities, and can be co-located with a Spoke, placed on IBM premises, business partner sites or customer premises.

In any event, under the present invention, the bandwidth consumption/requirements of environment 10 will be determined using consumption modeling system 40, which is shown implemented on computer system 14 as computer program code. To this extent, computer system 14 is shown including a processing unit 20, a memory 22, a bus 24, and input/output (I/O) interfaces 26. Further, computer system 14 is shown in communication with external (I/O) devices/resources 28 and a storage system 30. In general, processing unit 20 executes computer program code, such as consumption modeling system 40, which is stored in memory 22 and/or storage system 30. While executing computer program code, processing unit 20 can read and/or write data, to/from memory 22, storage system 30, and/or I/O interfaces 26. Bus 24 provides a communication link between the components in computer system 14. External devices 28 can comprise any device (e.g., keyboard, pointing device, display, etc.) that enables a user to interact with computer system 14 and/or any device (e.g., network card, modem, etc.) that enables computer system 14 to communicate with one or more other computing devices, such as those in environment 10.

Communications between computer system 14 and environment 10 can occur over one or more networks. Such a network can comprise any combination of various types of communications links. For example, the network can comprise addressable connections that may utilize any combination of wired and/or wireless transmission methods. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer system 14 is only representative of various possible computer infrastructures that can include numerous combinations of hardware. For example, processing unit 20 may comprise a single processing unit, or be distributed across one or more processing units in one or more locations, e.g., on a client and server. Similarly, memory 22 and/or storage system 30 can comprise any combination of various types of data storage media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. To this extent, computer system 14 can comprise any type of computing device such as a desktop computer, a laptop computer, a workstation, a server, a handheld device, a mobile phone, a pager, a personal data assistant, etc. However, if computer system 14 comprises a handheld device or the like, it is understood that one or more external devices 28 (e.g., a display) and/or storage system 30 could be contained within computer system 14, not externally as shown.

Storage system 30 can be any type of system (e.g., a database) capable of providing storage for information (e.g., environment details, variables, etc.) under the present invention. As such, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is consumption modeling system 40, which includes environment analysis system 42, variable gathering system 44, bandwidth calculation system 46, and environment deployment system 48. Operation of these systems is discussed further below. However, it is understood that some of the various systems shown in FIG. 1 can be implemented independently, combined, and/or stored in memory for one or more separate computers systems 14 that communicate over a network. Further, it is understood that some of the systems/functionality may not be implemented and/or additional systems/functionality may be included as part of the present invention.

In determining bandwidth consumption for environment, environment analysis system 42 will first "map out" environment 10. Specifically, environment analysis system 42 will identify tiers 12A-D as well as any components and associated applications of environment 10. Once these items have been identified, environment analysis system 42 will determine/identify all communication flows occurring within environment 10. As will be further shown in conjunction with FIG. 2, such communication flows typically occur between applications from tier to tier and/or component to component. Moreover, under the present invention, such communication flows typically involve the communication of a software-based package or the like from one application to another. It should also be understood that a single communication flow between two applications could actually involve a push or pull of a package from one or more source computers (e.g., starting points) to one or mode destination computers (e.g., endpoints). That is, it should not be assumed that because a communication flow is occurring between two applications, only two computers are involved. In any event, the mapping of environment 10 could be determined based on an analysis of environment 10 by environment analysis system 42, based on details of environment 10 (including its communication flows) as provided by an administrator 16 or the like, or a combination thereof. If details are provided by administrator 16, they can be provided in a configuration file or the like.

Figure 2:
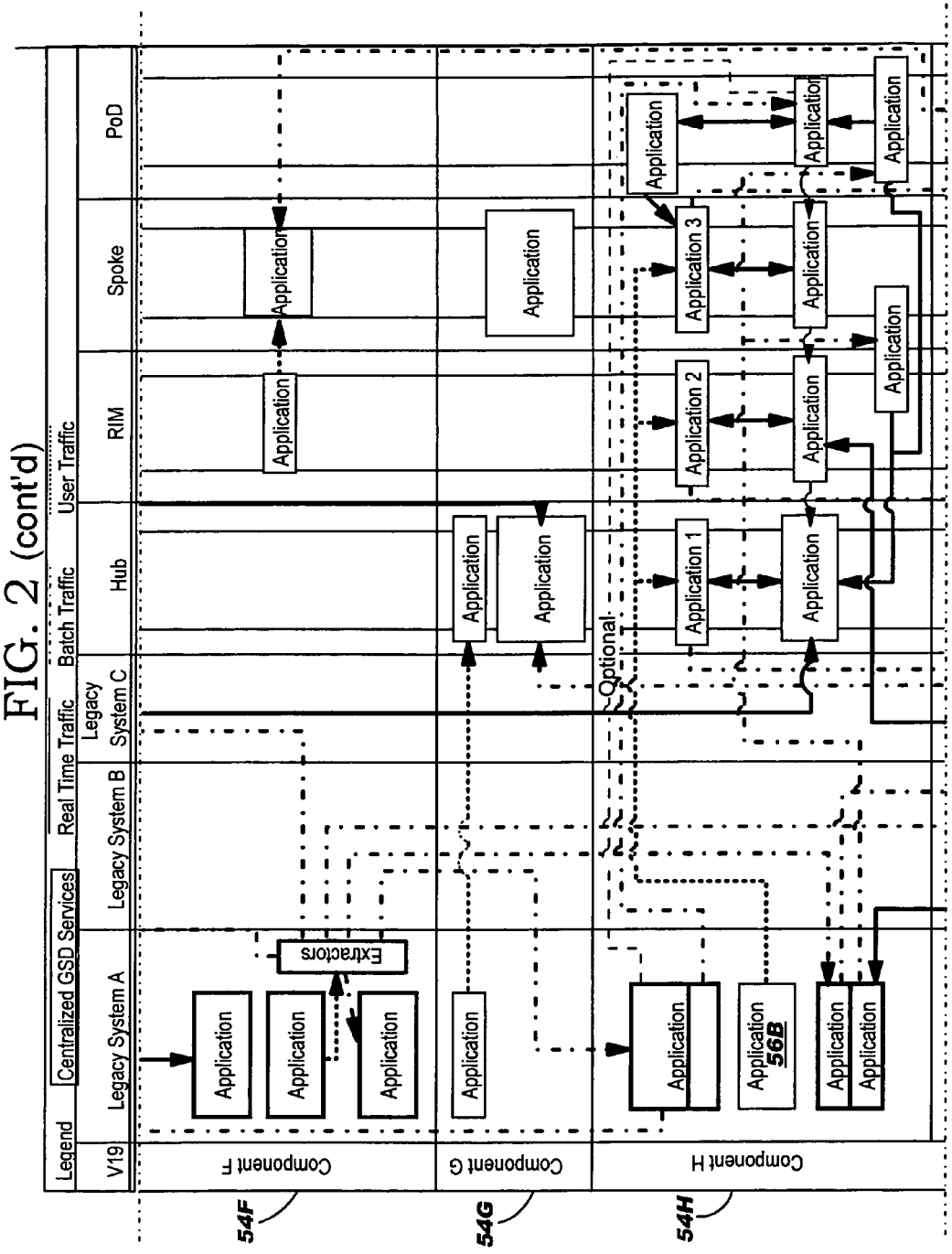
FIG. 2 (shown in drawings sheets 2-4) depicts a more detailed diagram of the multi-tiered computer environment of FIG. 1 as determined according to the present invention.
Figure 2:
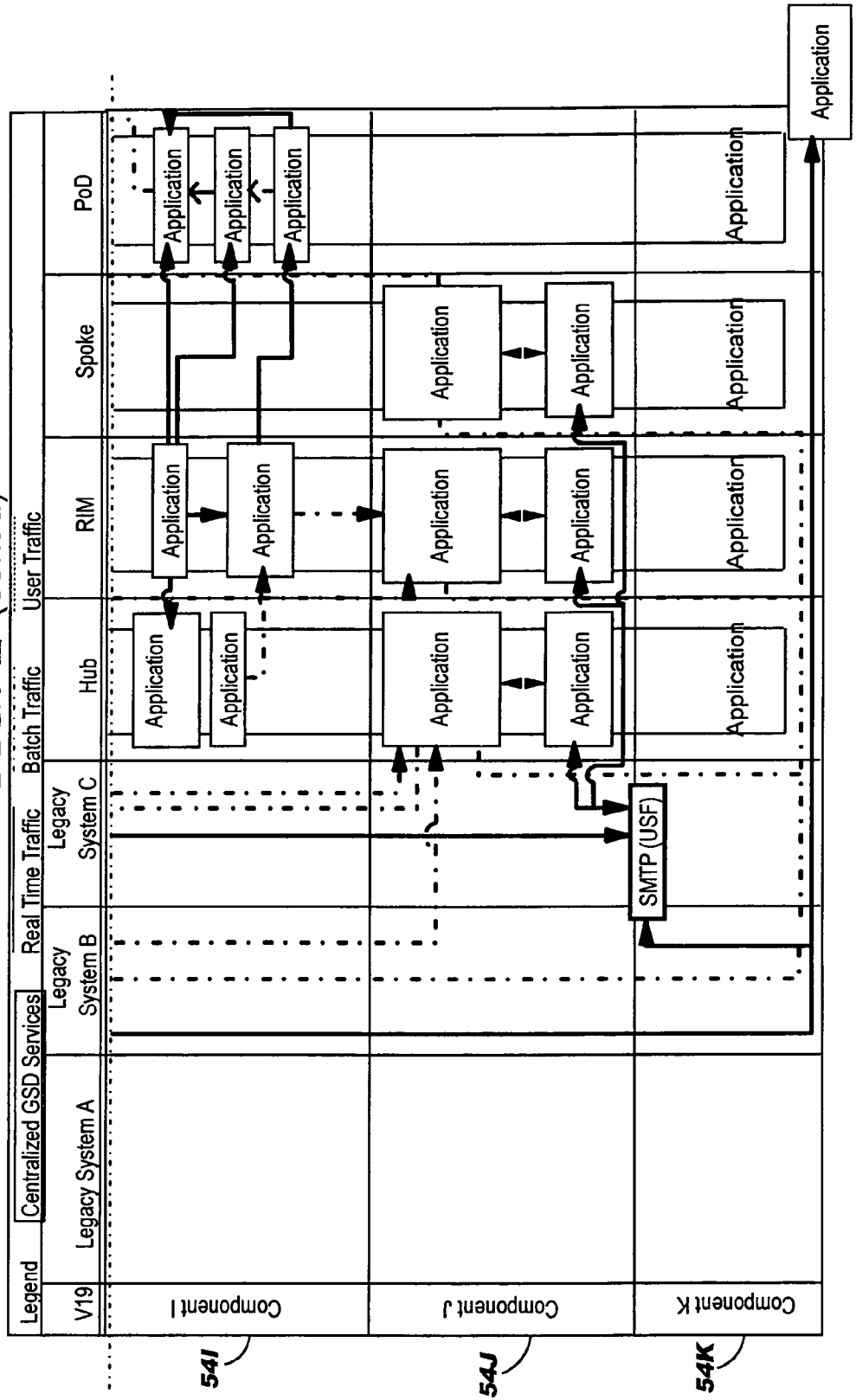

Referring now to FIG. 2 (shown on drawing sheets 2-4), an illustrative mapping 50 of environment 10 (FIG. 1) is shown. As shown, mapping includes tiers 12A-D as well as components 54A-K. In addition, mapping 50 also shows legacy systems 52A-C that exist outside of environment 10, but interface therewith. Examples of components 54A-K can include, among others, a Billing component, a HelpDesk component, a monitoring component, etc. Each component 54A-K can include one or more applications located among the tiers 12A-D and legacy systems 52A-C. As indicated above, environment analysis system 42 will determine a placement of such applications. For example, component 54A includes an application 56A placed/positioned in the Hub tier 12A.

Once the placement of applications among tiers 12A-D and legacy systems 52A-C has been identified, environment analysis system 42 (FIG. 1) will identify the communication flows between the applications. In mapping 50, such communication flows are represented by the arrows linking the applications. In general, multiple different types of communication flows can be identified. For example, communication flow 58A represents real-time traffic, communication flow 58B represents batch traffic, while communication flow 58C represents user traffic. As will be further discussed below, the type of communication flow plays a role in determining the bandwidth consumption thereof. Similar to establishing mapping 50, the determination of the type of communication flow can be determined by environment analysis system 42 with or without data being provided by administrator 16 (FIG. 1).

Figure 3:
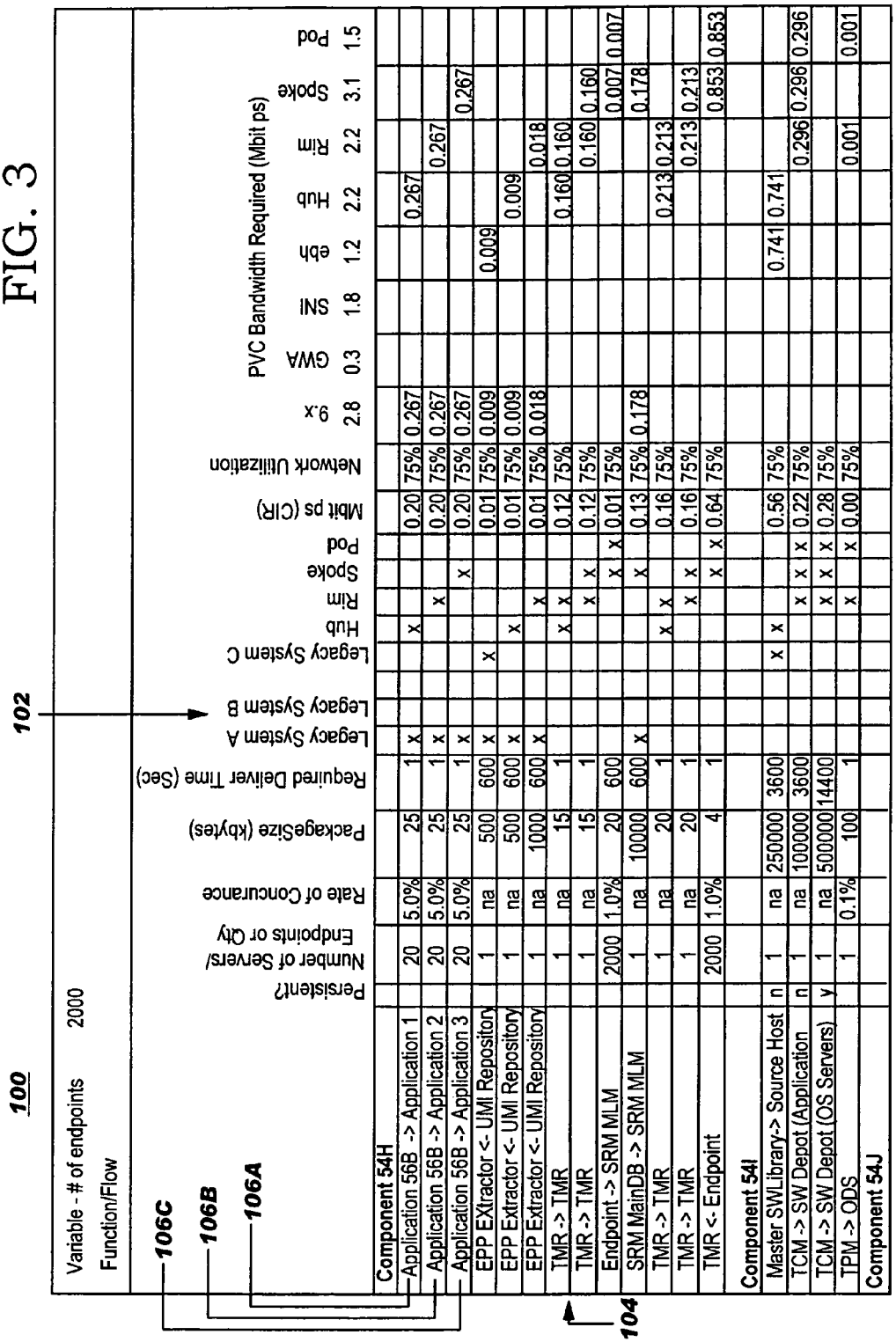
FIG. 3 depicts illustrative bandwidth consumption values for the communication flows of FIG. 2 as determined according to the present invention.

Referring back to FIG. 1, once the complete mapping 50 (FIG. 2) of environment 10 has been established, variable gathering system 44 will gather/obtain the variables needed to determine the bandwidth consumption for each communication flow. Under the present invention, these variables generally include one or more of the following:

(1) Whether the communication flow is persistent. A communication flow is persistent if only a single push or pull of a package is needed after which the transfer thereof will automatically propagate to other tiers/nodes;

(2) A payload/package size of the communication flow (e.g., in bits or bytes);

(3) A quantity of destination computers (endpoints) for the communication flow. In a typical embodiment, the term destination computer refers to a server. However, this need not be the case. That is, clients could be considered destination computers under the present invention;

(4) A required delivery time for the communication flow. This can be based on the type of communication flow. For example, a communication flow that is performed real time should be accomplished faster than a communication flow that is performed in batch;

(5) A desired network utilization for environment 10. For example, administrator 16 might not want to utilize up to 100% of environment 10 in making a communication flow; and (6) A rate of simultaneous use of applications involved the communication flow. These variables can be provided from administrator 16 (e.g., via a configuration file), or stored within environment in a location that is accessible to variable gathering system 44. Regardless, once these variables are gathered, bandwidth calculation system 46 will determine/calculate the bandwidth consumption for each communication flow using the following formula:

((Number of Destination Computers*Rate of Simultaneous Use)*((Package Size*8)/Required Delivery Time)/1000)/Network Utilization Under the present invention, the required variables and the computed bandwidth consumption values can be populated into a table 100 or the like such as that shown in FIG. 3. Shown along the top horizontal legend 102 of table 100 are the variables as well as the legacy systems and tiers of environment 10 (FIG. 1). Shown along the vertical legend 104 are the individual components with their associated applications. Hypothetical names of applications have been inserted for illustrative purposes only. Table 100 can provide a quick reference for bandwidth consumption for the individual communication flows. For example, in mapping 50 of FIG. 2, there are communication flows that originate from the application 56B (in component 54H and the legacy system 52A) and extend to the three applications "1-3" placed in the tiers 12A-C. These communication flows are represented by rows 106A-C of table 100, respectively.

In viewing row 106A, it can be seen that the following variables have the associated values:

Number of destination computers—20

Rate of simultaneous use—5.0%

Package Size—25 Kbytes

Required Delivery Time—1 second

Network Utilization—75%

When these values are inserted into the above equation, a bandwidth consumption of 0.267 is yielded for this communication flow as follows:

$$0.267 = ((20*0.5)*((25*8)/1)/1000)/0.75$$

The remainder of table 100 can be filled out in a similar manner by bandwidth calculation system 46. Once all of the individual bandwidth consumptions have been determined, bandwidth calculation system 46 can aggregate the same to yield a total bandwidth consumption across environment 10. Based on the bandwidth consumption, environment deployment system 48 can make recommendations regarding the deployment of environment. For example, environment deployment system 48 could recommend physical placements for tiers, hardware, software, or any combination thereof. Moreover, the computed bandwidth consumption will also be used in determined how and where to allocate the available bandwidth to best meet the needs of the environment 10.

Figure 4:
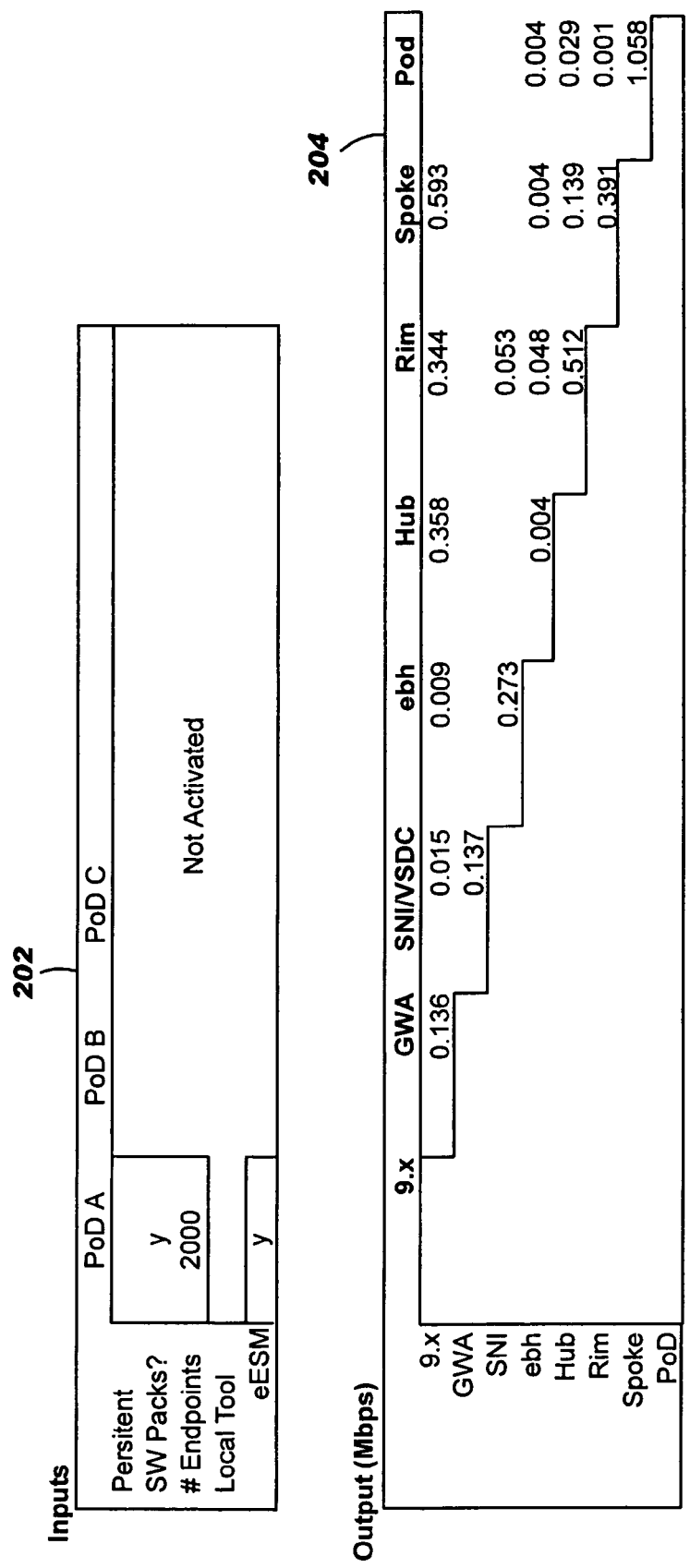
FIG. 4 depicts illustrative input and output values as determined according to the present invention.

Referring to FIG. 4, a summary 200 of inputs 202 and outputs 204 across legacy systems 52A-C and tiers 12A-D is shown. Specifically, inputs 202 represent the input variables for the items that drive bandwidth usage (e.g., number of users, persistence, number of destination computers supported, etc.). For example, in viewing outputs 204, it can be seen that bandwidth consumption for communication flows occurring between legacy system 52A and Hub tier 12A is 0.358. Summary 200 thus gives an effective snapshot of bandwidth consumption across tiers 12A-D and legacy systems 52A-C.

Figure 5:
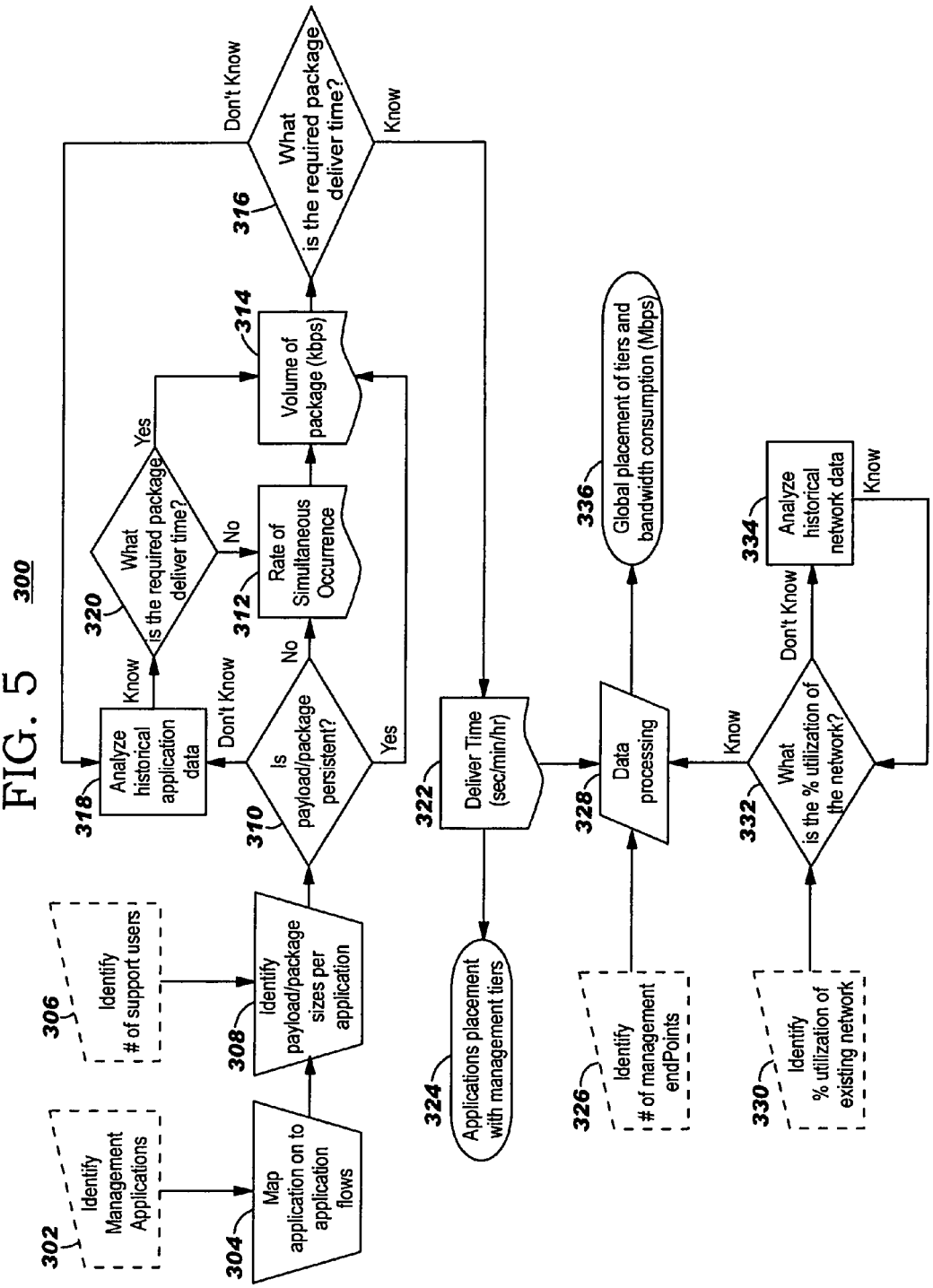
FIG. 5 depicts a flow diagram according to the present invention.

Referring now to FIG. 5, a method flow diagram 300 according to the present invention shown. As depicted, step 302 is to identify the applications in the environment. This step assumes that the tiers and components of the environment have already been identified. In step 304, the application to application communication flows are determined. As mentioned above, a communication flow typically involves the pushing or pulling of a package (e.g., software-based) from one application to another. In step 306, the number of users of the applications (e.g., support users) involved with the communication flows are identified. This number will be helpful in determine the rate of simultaneous use of the applications. In step 308, the size (e.g., payload/package size) of the communication flows is determined. For example, a communication flow from application "A" to application "B" could involve a payload/package that is 25 Kbytes in size. This value is determined in step 308. Step 310 is to determine whether the communication flows or packages involved therewith are persistent. In general, a communication flow or corresponding package is persistent if, at any point, it becomes self-propagating within the environment. Specifically, assume that package "A" must be pushed from a single computer in the Hub tier, to three computers in the Rim tier and then to fifteen computers in the Spoke tier. The package would be persistent if it were pushed once to the computers in the Rim tier, and then it automatically propagated to the fifteen computers in the Spoke tier.

In any event, if a package is persistent, then the process jumps to step 314 where a data value representing the size of the package is determined. If, however, a package is not persistent, then the process first proceeds to step 312 where the rate of simultaneous occurrence/use of the associated applications is determined before the payload/package size is determined in step 314. If, however, it cannot be determined whether a package is persistent in step 310, historical application data will be analyzed in step 318. Such data might indicate whether the same package or similar packages (e.g., previous versions) were self-propagating in the past. Once any such data has been analyzed, it can then be determined in step 320 whether the package is persistent. Just as with step 310, if a package is not persistent, the rate of simultaneous use of the associated applications will be determined in step 312 before the payload/package size is determined in step 314. If however, the package is persistent, the payload/package size will be determined in step 314.

Once the payload/package size has been determined, the required delivery time for the communication flows can be determined in step 316. As mentioned above, this can be based on, among other things, the type of communication flow. For example, a real-time type of communication flow between two applications might have to occur faster than would a batch type of communication flow between two applications. Once the required delivery time has been finally determined in step 322, it can be used to determine the placement of applications within one or more tiers of the environment in step 324. Specifically, the delivery time identifies and reduces the likelihood that the application would be inappropriately placed where it could not meet the desired communications flows required to deliver the package/payload in a timely manner. Before the bandwidth consumption for the environment can be computed in step 328, other relevant variables are determined. For example, in step 326 the number of destination computers (endpoints) are determined. As indicated above, destination computers are typically servers. However, any type of computer (e.g., clients) could also be considered as destination computers within the scope of the present invention. In addition, in steps 330 and 332 the network utilization is gathered or determined. This value is important because an administrator might not want to utilize up to 100% of the bandwidth in a given environment. If this value cannot be determined in step 332, historical data can be examined in step 334 similar to the determination of whether a package was persistent. Specifically, a given communication flow might have been previously performed with a certain network utilization. That value could be useful in determining what the network utilization should be for the current communication flow. In any event, once these variables have been determined, they will be processed as described above to yield individual bandwidth consumption values for the communication flows, which will then be aggregated to yield the total bandwidth consumption across the entire environment in step 328. Using this total value, the deployment of the environment (e.g., the placement of the tiers, allocation of the bandwidth, etc.) can be determined in step 336.

It should be appreciated that the teachings of the present invention could be offered as a business method on a subscription, advertising, and/or fee basis. For example, consumption modeling system 40, (FIG. 1) and/or a computer infrastructure such as computer system 14 (FIG. 1) could be generated, maintained, supported and/or deployed by a service provider that offers the functions described herein for customers. That is, a service provider could offer to determine bandwidth consumption across a multi-tiered computer environment as shown and discussed above. To this extent, the invention can further comprise providing a computer infrastructure and deploying an application that is operable to perform the invention.

It is understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product that is stored on a computer-readable medium which comprises all the respective features enabling the implementation of the methods described herein, and which—when loaded in a computer system/deployed to a computing infrastructure—is able to carry out these methods. Computer program product, application, software program, program, and software, are synonymous in the present context and mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for determining bandwidth consumption across a geographically distributed multi-tiered computer environment, comprising:
   a computer system identifying communication flows throughout the multi-tiered computer environment;
   a second computer system determining the bandwidth consumption for the communication flows based on a number of destination computers for the communication flows, a rate of simultaneous use of applications involved with the communication flows, a package size, a required delivery time for the communication flows and a desired network utilization for the communication flows; and a third computer system aggregating the bandwidth consumption for every one of the communications flows, the bandwidth consumption of each of the every one of the communications flows being calculated by:

(The Number of Destination Computers * The Rate of Simultaneous use)*((The Package Size*8)/The Required Delivery Time)/1000)/The Desired Network Utilization.

2. The method of claim 1, further comprising:
   identifying components and tiers of the multi-tiered computer environment; and
   determining a placement of the applications among the components and tiers, wherein the communication flows are between the applications.

3. The method of claim 1, further comprising deploying the multi-tiered computer environment based on the determined bandwidth consumption across the multi-tiered computer environment.

4. The method of claim 1, further comprising determining a type of the communication flows, wherein the required delivery time for the communication flows is based on the type.

5. The method of claim 1, further comprising determining whether the communication flows is persistent.

6. The method of claim 1, further comprising:
   determining a number of users of the multi-tiered computer environment; and
   determining a number of servers in the multi-tiered computer environment.

7. The method of claim 1, wherein the multi-tiered computer environment interfaces with at least one legacy system, and wherein the communication flows include communication flows between the multi-tiered environment and the at least one legacy system.

8. A system for determining bandwidth consumption across a geographically distributed multi-tiered computer environment, comprising:
   a system for identifying communication flows throughout the multi-tiered computer environment;
   a system for obtaining a number of destination computers for the communication flows, a rate of simultaneous use of applications involved with the communication flows, a package size, a required delivery time for the communication flows and a desired network utilization for the communication flows; and
   a system for determining bandwidth consumption for the communication flows by aggregating the bandwith consumption for every one of the communications the bandwith consumption of each of the every one of the communications flows being calculated by:

(The Number of Destination Computers * The Rate of Simultaneous use)*((The Package Size*8)/The Required Delivery Time)/1000)/The Desired Network Utilization.

9. The system of claim 8, wherein the system for identifying the communication flows identifies components and tiers of the multi-tiered computer environment, and determines a placement of the applications among the components and tiers, and wherein the communication flows are between the applications.

10. The system of claim 8, further comprising a system for proposing a deployment of the multi-tiered computer environment based on the determined bandwidth consumption across the multi-tiered computer environment.

11. The system of claim 8, wherein the required delivery time for the communication flows is based on a the type of the communication flows.

12. The system of claim 8, wherein the multi-tiered computer environment interfaces with at least one legacy system, and wherein the communication flows include communication flows between the multi-tiered environment and the at least one legacy system.

13. A program product stored on a computer readable medium for determining bandwidth consumption across a geographically distributed multi-tiered computer environment, the computer readable medium comprising program code for performing the following steps:
   identifying communication flows throughout the multi-tiered computer environment;
   obtaining a number of destination computers for the communication flows, a rate of simultaneous use of applications involved with the communication flows, a package size ,a required delivery time for the communication flows and a desired network utilization for the communication flows; and
   determining bandwidth consumption for the communication flows by aggregating the bandwith consumption for every one of the communications flows, the bandwith consumption of each of the every one of the communications flows being calculated by:

(The Number of Destination Computers * The Rate of Simultaneous use)*((The Package Size*8)/The Required Delivery Time)/1000)/The Desired Network Utilization.

14. The program product of claim 13, wherein the computer readable medium further comprises program code for performing the following steps:
   identifying components and tiers of the multi-tiered computer environment; and
   determining a placement of the applications among the components and tiers, wherein the communication flows are between the applications.

15. The program product of claim 13, wherein the computer readable medium further comprises program code for performing the following step:
   proposing a deployment of the multi-tiered computer environment based on the determined bandwidth consumption across the multi-tiered computer environment.

16. A method for deploying an application for determining bandwidth consumption across a geographically distributed multi-tiered computer environment, comprising:
   providing a computer infrastructure being operable to:
      identify communication flows throughout the multi-tiered computer environment;
      obtain a number of destination computers for the communication flows, a rate of simultaneous use of applications involved with the communication flows, a package size, a required delivery time for the communication flows and a desired network utilization for the communication flows; and
      determine bandwidth consumption for the communication flows by aggregating the bandwith consumption for every one of the communications flows, the bandwith consumption of each of the every one of the communications flows being calculated by:

(The Number of Destination Computers * The Rate of Simultaneous use)*((The Package Size*8)/The Required Delivery Time)/1000)/The Desired Network Utilization.

17. The method of claim 16, wherein the computer infrastructure is further operable to:
   identify components and tiers of the multi-tiered computer environment; and
   determine a placement of the applications among the components and tiers, wherein the communication flows are between the applications;
   aggregate the bandwidth consumption for the communication flows to determine the bandwidth consumption across the multi-tiered computer environment; and
   propose a deployment of the multi-tiered computer environment based on the determined bandwidth consumption across the multi-tiered computer environment.

* * * * *